US006639954B2

United States Patent
Kuroiwa et al.

(10) Patent No.: US 6,639,954 B2
(45) Date of Patent: *Oct. 28, 2003

(54) MOBILE COMMUNICATION TERMINAL AND TRANSMISSION-BIT-RATE DETECTION METHOD

(75) Inventors: Koichi Kuroiwa, Kawasaki (JP); Mahiro Hikita, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,832

(22) Filed: May 26, 1999

(65) Prior Publication Data

US 2003/0095613 A1 May 22, 2003

(30) Foreign Application Priority Data

May 28, 1998 (JP) .............................. 10-147760

(51) Int. Cl.⁷ .............................. H04B 7/26; H04B 7/08
(52) U.S. Cl. ........................................ 375/341; 714/795
(58) Field of Search ................................ 375/224, 262, 375/265, 316, 340, 341; 381/2; 455/185.1, 186.1; 714/794, 795

(56) References Cited

U.S. PATENT DOCUMENTS

| | | | | |
|---|---|---|---|---|
| 5,469,452 A | * | 11/1995 | Zehavi | 714/792 |
| 5,638,408 A | * | 6/1997 | Takaki | 375/341 |
| 5,710,784 A | * | 1/1998 | Kindred et al. | 375/262 |
| 5,774,496 A | * | 6/1998 | Butler et al. | 375/225 |
| 5,796,757 A | * | 8/1998 | Czaja | 714/789 |
| 5,878,098 A | * | 3/1999 | Wang et al. | 375/377 |
| 5,953,636 A | * | 9/1999 | Keate et al. | 455/3.02 |
| 5,978,428 A | * | 11/1999 | Hayashi | 375/377 |
| 5,987,631 A | * | 11/1999 | Kong | 714/704 |
| 6,097,716 A | * | 8/2000 | Abrishamkar | 370/342 |
| 6,170,073 B1 | * | 1/2001 | Jarvinen et al. | 714/758 |
| 6,175,590 B1 | * | 1/2001 | Stein | 375/225 |
| 6,424,631 B1 | * | 7/2002 | Czaja et al. | 370/252 |

FOREIGN PATENT DOCUMENTS

JP 08139695 5/1996

OTHER PUBLICATIONS

Office Action issued against copending Korean patent application (including English–language translation).

* cited by examiner

Primary Examiner—Young T. Tse
(74) Attorney, Agent, or Firm—Staas & Halsey LLP

(57) ABSTRACT

A mobile communication terminal which receives convolutionally encoded data that is convolutionally encoded information of a speech channel transmitted from a base station and detects a transmission bit rate selected at the base station by decoding the data. The mobile communication terminal comprises a rate estimation unit which estimates the transmission bit rate selected at the base station and outputs an estimated transmission bit rate, a decoding unit which decodes the convolutionally encoded data transmitted from the base station and outputs decoded data and predetermined types of results of decoding, a convolutional re-encoding unit which convolutionally re-encodes the decoded data and outputs re-encoded data, and a rate detection unit which detects whether the estimated transmission bit rate is correct or not based on the decoded data and the predetermined types of results of decoding.

61 Claims, 13 Drawing Sheets

FIGURE 6A
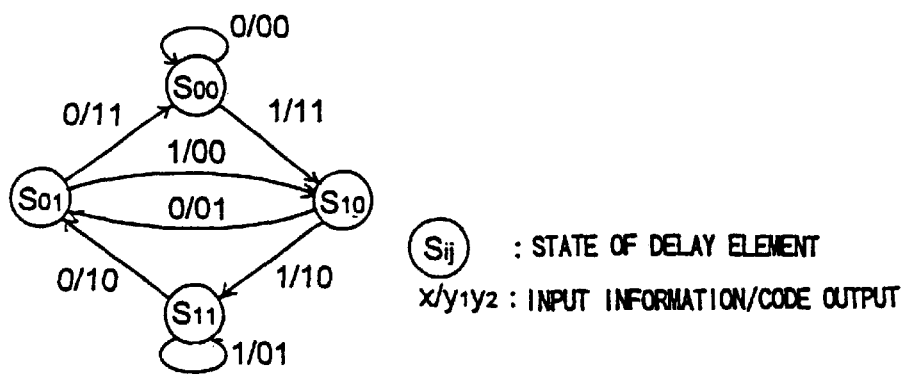
(a) STATE TRANSITION DIAGRAM
FIGURE 6B
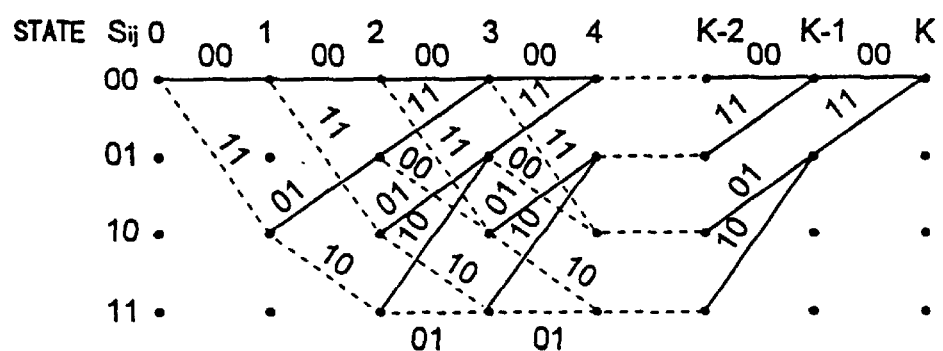
(b) TRELLIS DIAGRAM
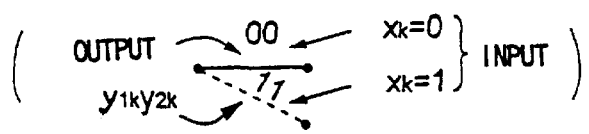

| | | | | | | |
|---|---|---|---|---|---|---|
| INPUT INFORMATION ($x_k$) | | 1 | 1 | 0 | 1 | 0 | 0 |
| OUTPUT SEQUENCE ($y_{1k}y_{2k}$) | | 11 | 10 | 10 | 00 | 01 | 11 |
| ERROR SEQUENCE ($e_{1k}e_{2k}$) | | 10 | 00 | 10 | 00 | 00 | 01 |
| RECEIVED SEQUENCE ($z_{1k}z_{2k}$) | | 01 | 10 | 00 | 00 | 01 | 10 |

| | | | | | | | |
|---|---|---|---|---|---|---|---|
| | $\lambda_{00}^{(k)}$ | 1 | 1 | 0 | 0 | 1 | 1 |
| BRANCH METRIC | $\lambda_{01}^{(k)}$ | 0 | 2 | 1 | 1 | 0 | 2 |
| | $\lambda_{10}^{(k)}$ | 2 | 0 | 1 | 1 | 2 | 0 |
| | $\lambda_{11}^{(k)}$ | 1 | 1 | 2 | 2 | 1 | 1 |

MOBILE COMMUNICATION TERMINAL AND TRANSMISSION-BIT-RATE DETECTION METHOD

BACKGROUND OF THE INVENTION

1. Field of the Invention

The present invention generally relates to a mobile communication system, and more particularly to a mobile communication terminal which detects a transmission bit rate that is selected at a base station and a transmission-bit-rate detection method.

In the field of mobile communication, access methods which assign maximum users to limited frequency resources are desired. These access methods include, for example, Frequency-Division Multiplex Access (FDMA), Time-Division Multiplex Access (TDMA) and Code-Division Multiplex Access (CDMA). In the FDMA and the TDMA, one radio station occupies one radio channel and slot. On the other hand, in the CDMA, a wide-band radio channel is shared among many users by adding proper code to a signal.

Presently, the mobile communication systems which employ the FDMA and the TDMA are in practical use. On the other hand, the mobile communication system which employs the CDMA is desired because it is robust against both interference and disturbance and can keep privacy. This is because the proper code is added to the signal in the CDMA.

2. Description of the Related Art

A conventional transmission-bit-rate detection method which detects a transmission bit rate that is selected at a base station for a conventional mobile communication system is explained below.

Generally, when the base station communicates with a mobile communication terminal, speech data and control data are transmitted through a speech channel in the mobile communication system which employs the CDMA. The speech channel can carry the speech data and the control data at any bit rate among 9.6 kbps, 4.8 kbps, 2.4 kbps and 1.2 kbps. The data is transmitted at a variable transmission bit rate using these four bit rates.

The base station adds error detection code, for example, Cyclic Redundancy Check (CRC), and tail bits to information bits of the speech channel. The CRC is only added when the transmission bit rate is either 9.6 kbps or 4.8 kbps. Next, the base station adds convolutional code for error correction to the information bits of the speech channel to which the CRC and the tail bits are added and generates transmission symbols. Then, the base station outputs the transmission symbols at the designated bit rate among 9.6 kbps, 4.8 kbps, 2.4 kbps and 1.2 kbps. When the designated bit rate is 9.6 kbps, then transmission symbols are output one time. When the designated bit rate is 4.8 kbps, then transmission symbols are repeatedly output twice. When the designated bit rate is 2.4 kbps, then transmission symbols are repeatedly output three times. When the designated bit rate is 1.2 kbps, then transmission symbols are repeatedly output four times. This is because the same number of bits is needed to detect the transmission bit rate at the mobile communication terminal.

Next, these transmission symbols are interleaved and scrambled with long Code which is a user identification code and enables synchronization at the mobile communication terminal. Then, power control bits are added. The power control bits control strength of a radio wave for each mobile communication terminal. A weak radio wave is transmitted to the mobile communication terminal near the base station and a strong radio wave is transmitted to the mobile communication terminal far from the base station to equalize the strengths of the radio waves received by the mobile communication terminals. After all of the processes described above are ended, the base station spreads spectrum of the transmission symbols over a wide band. Next, the base station modulates the transmission symbols and transmits the transmission symbols.

The mobile communication terminal of the mobile communication system which employs a spread spectrum method operates as follows to detect the transmission bit rate.

FIG. 1 shows main parts used to detect the transmission bit rate for the conventional mobile communication terminal.

At the mobile communication terminal, first, received data is demodulated and its spectrum is inverse-spread. Next, long Code is generated based on information from a sync channel and inverse spectrum spread data is descrambled using the information. Then, descrambled data is deinterleaved. As a result, received symbols are reproduced. The received symbols are supplied to four Viterbi decoders, such as a 9.6-kbps Viterbi decoder 101, a 4.8-kbps Viterbi decoder 102, a 2.4-kbps Viterbi decoder 103 and a 1.2-kbps Viterbi decoder 104, which are connected in parallel as shown in FIG. 1. Each decoder executes Viterbi decoding at each bit rate and outputs decoded data.

Convolutional re-encoders, such as a 9.6-kbps convolutional re-encoder 105, a 4.8-kbps convolutional re-encoder 106, a 2.4-kbps convolutional re-encoder 107 and a 1.2-kbps convolutional re-encoder 108, re-encode the decoded data. A selector 109 compares the data which is re-encoded by the convolutional re-encoders with the received data. Then, the selector 109 detects the transmission bit rate based on comparison results which have minimum errors. The bit rate of the convolutional re-encoder which outputs re-encoded data with minimum errors is the transmission bit rate and the decoded data of the Viterbi decoder which has the same bit rate as that of the convolutional re-encoder with minimum errors is output to a codec. The conventional mobile communication terminal detects the transmission bit rate described above.

However, in the conventional mobile communication terminal, the four Viterbi decoders, consisting of the 9.6-kbps Viterbi decoder 101, the 4.8-kbps Viterbi decoder 102, the 2.4-kbps Viterbi decoder 103 and the 1.2-kbps Viterbi decoder 104, shown in FIG. 1 decode the received data simultaneously at all bit rates. Moreover, the four convolutional re-encoders, consisting of the 9.6-kbps convolutional re-encoder 105, the 4.8-kbps convolutional re-encoder 106, the 2.4-kbps convolutional re-encoder 107 and the 1.2-kbps convolutional re-encoder 108, re-encode the decoded data simultaneously at all bit rates.

In the conventional mobile communication terminal, the Viterbi decoding and the convolutional re-encoding at all bit rates are executed simultaneously. Therefore, this results in both increase of a circuit scale and increase of consumption power.

SUMMARY OF THE INVENTION

It is a general object of the present invention to provide a mobile communication terminal in which the above disadvantages are eliminated.

A more specific object of the present invention is to provide a mobile communication terminal which enables a small-sized mobile communication terminal based on reduction of the circuit scale and reduction of the consumption power of the mobile communication terminal.

The above objects of the present invention are achieved by a mobile communication terminal which receives convolutionally encoded data that is convolutionally encoded information of a speech channel transmitted from a base station and detects a transmission bit rate selected at the base station by decoding the data. The mobile communication terminal comprises a rate estimation unit which estimates the transmission bit rate selected at the base station and outputs an estimated transmission bit rate, a decoding unit which decodes the convolutionally encoded data transmitted from the base station and outputs decoded data and predetermined types of results of decoding, a convolutional re-encoding unit which convolutionally re-encodes the decoded data and outputs re-encoded data, and a rate detection unit which detects whether the estimated transmission bit rate is correct or not based on the decoded data and the predetermined types of results of decoding.

As the transmission bit rate is estimated by the mobile communication terminal, a plurality of decoders for all bit rates is not necessary. A plurality of re-encoders is also not necessary for the same reason. Therefore, the simultaneous decoding of the received data by four decoders at all bit rates and the simultaneous re-encoding of the decoded data by four re-encoders at all bit rates are not necessary. This results in the small-sized mobile communication terminal based on the reduction of the circuit scale and enables the reduction of the consumption power of the mobile communication terminal.

The above objects of the present invention are achieved by a transmission-bit-rate detection method for a mobile communication terminal which receives convolutionally encoded data that is convolutionally encoded information of a speech channel transmitted from a base station. The transmission-bit-rate detection method comprises a rate estimation step which estimates the transmission bit rate selected at the base station and outputs an estimated transmission bit rate, a decoding step which decodes the convolutionally encoded data transmitted from the base station and outputs decoded data and predetermined types of results of decoding, a convolutional re-encoding step which convolutionally re-encodes the decoded data and outputs re-encoded data, and a rate detection step which determines whether the estimated transmission bit rate is correct or not based on the decoded data and the predetermined types of results of decoding.

As the transmission bit rate is estimated by the rate estimation step, a plurality of decoders for all bit rates is not necessary. A plurality of re-encoders is also not necessary for the same reason. Therefore, the simultaneous decoding of the received data by four decoders at all bit rates and the simultaneous re-encoding of the decoded data by four re-encoders at all bit rates are not necessary because the transmission-bit-rate detection method is executed. This results in the small-sized mobile communication terminal based on the reduction of the circuit scale and enables the reduction of the consumption power of the mobile communication terminal.

BRIEF DESCRIPTION OF THE DRAWINGS

Other objects, features and advantages of the present invention will become more apparent from the following detailed description when read in conjunction with the accompanying drawings, in which:

FIG. 6(a) is a state transition diagram of the convolutional encoder;

FIG. 6(b) is a trellis diagram of the state transition diagram of the convolutional encoder;

DESCRIPTION OF THE PREFERRED EMBODIMENTS

A transmission-bit-rate detection method for a mobile communication terminal of a first embodiment of the present invention, which mobile communication terminal detects the transmission bit rate selected at the base station, will be explained below.

Figure 1:
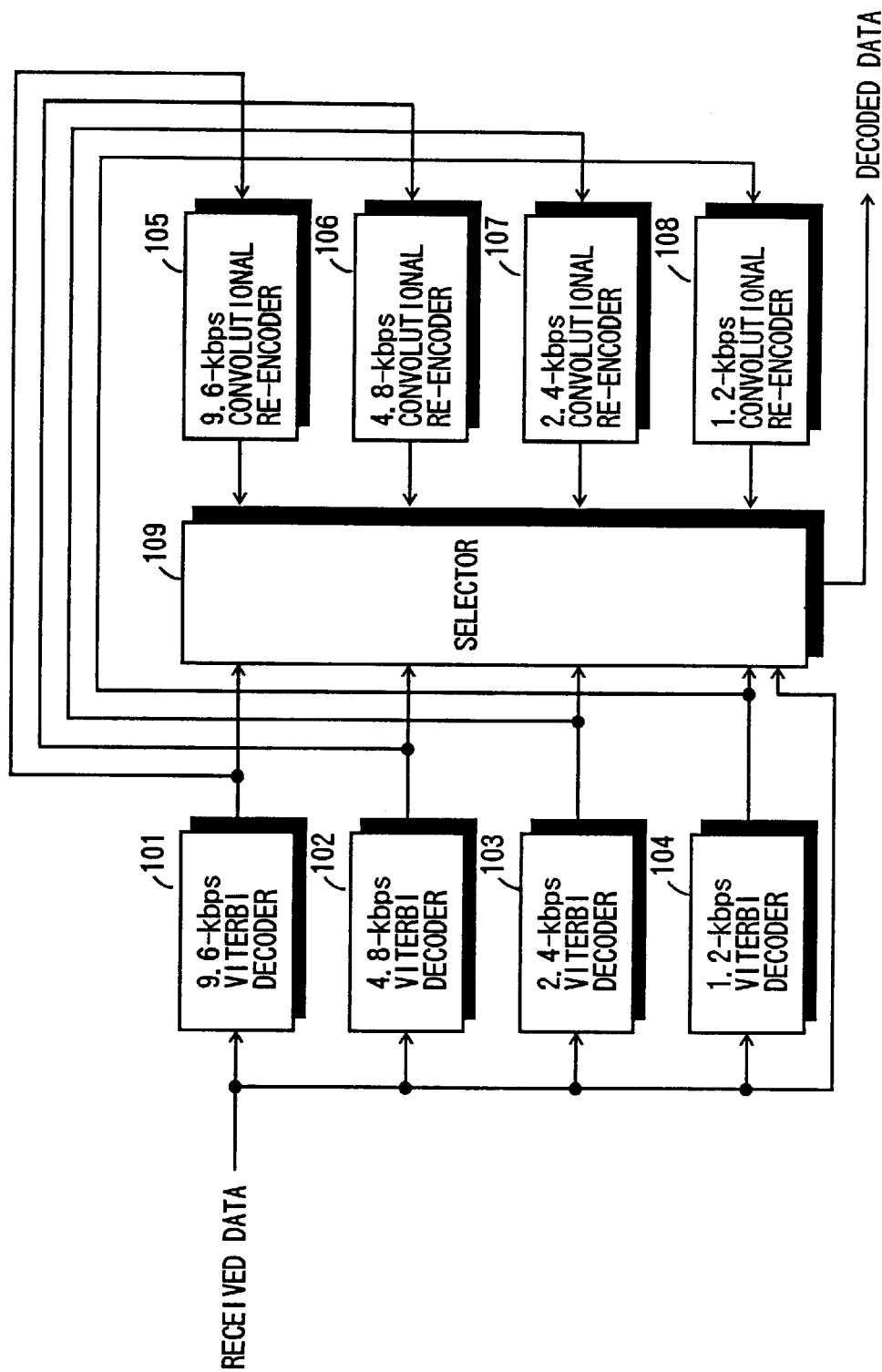
FIG. 1 shows main parts used to detect a transmission bit rate for a conventional mobile communication terminal.
Figure 2:
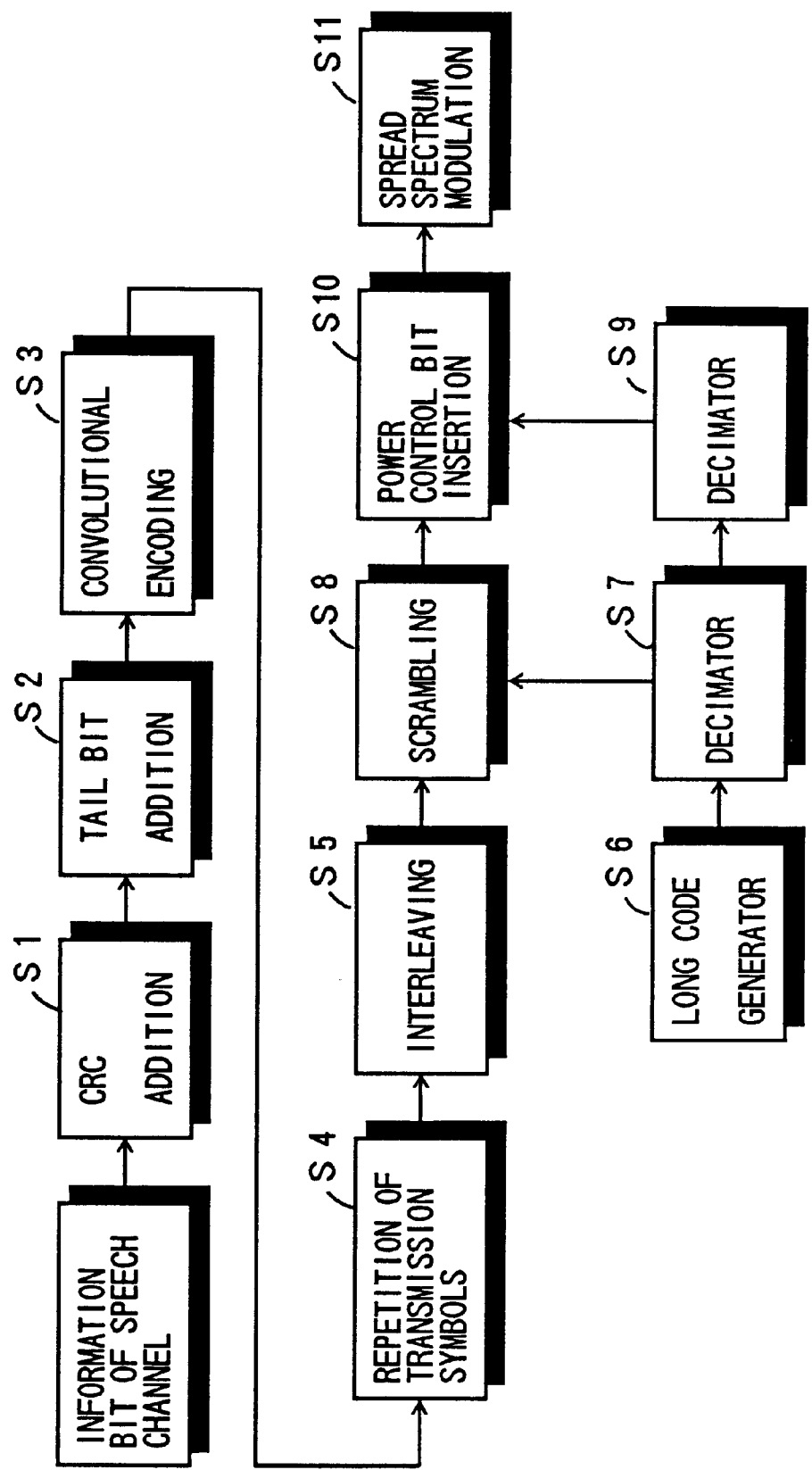
FIG. 2 is a transmission data generation process at a base station in a mobile communication system.

FIG. 2 shows a transmission data generation process at a base station in a mobile communication system. When the base station communicates with a mobile communication terminal, speech data and control data are transmitted through a speech channel in the mobile communication system which employs CDMA. The speech channel can carry the speech data and the control data with any bit rate among 9.6 kbps, 4.8 kbps, 2.4 kbps and 1.2 kbps. The data is transmitted with a variable transmission bit rate using these four bit rates.

Figure 3:
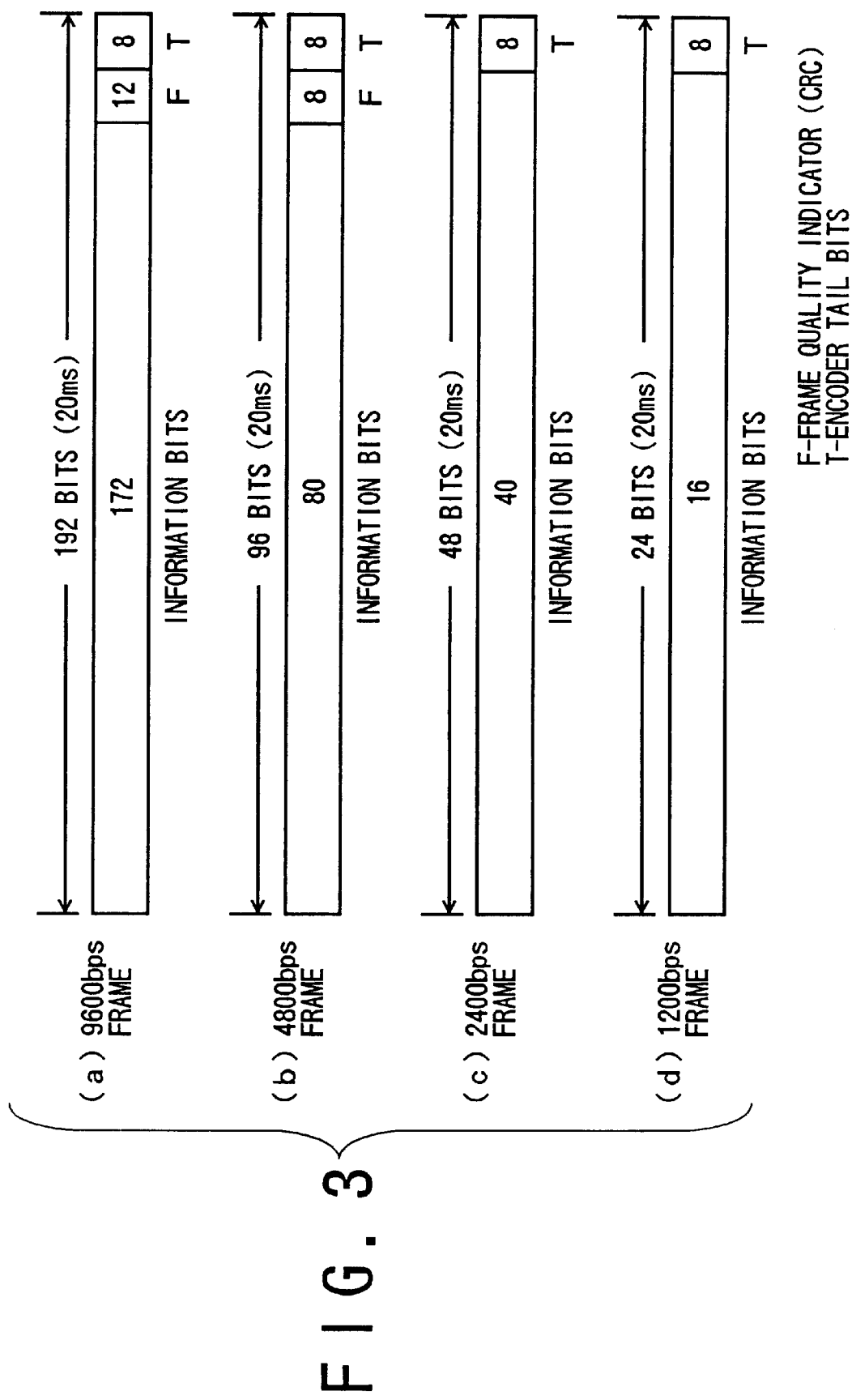
FIG. 3 is a frame structure of a speech channel.

FIG. 3 shows a frame structure of the speech channel. At the base station, for example, a cyclic code F for error detection is added to information bits in a CRC addition step S1 of FIG. 2, when a transmission bit rate of either 9.6 kbps or 4.8 kbps is selected as shown in FIGS. 3(a) and (b). The error detection by the cyclic code is called CRC(Cyclic Redundancy Check). A polynomial expression of data received by the mobile communication terminal is divided by a generation polynomial. The received data is checked as to whether it is encoded data or not according to whether a remainder is equal to zero or not.

Next, in a tail bit addition step S2 of FIG. 2, tail bits are added to the information bits when the transmission bit rate is either 2.4 kbps or 1.2 kbps or to the information bits with the CRC when the transmission bit rate is either 9.6 kbps or 4.8 kbps as shown in FIGS. 3(a), (b), (c) and (d). A convolutional encoder in the base station is initialized by adjusting all tail bits to be zero.

Next, in a convolutional encoding step S3 in FIG. 2, a convolutional code for error correction is added to the information bits to which the tail bits are added in order to generate transmission symbols. In the convolutional encoding process, information of past blocks affect a present convolutional encoding block.

Figure 4:
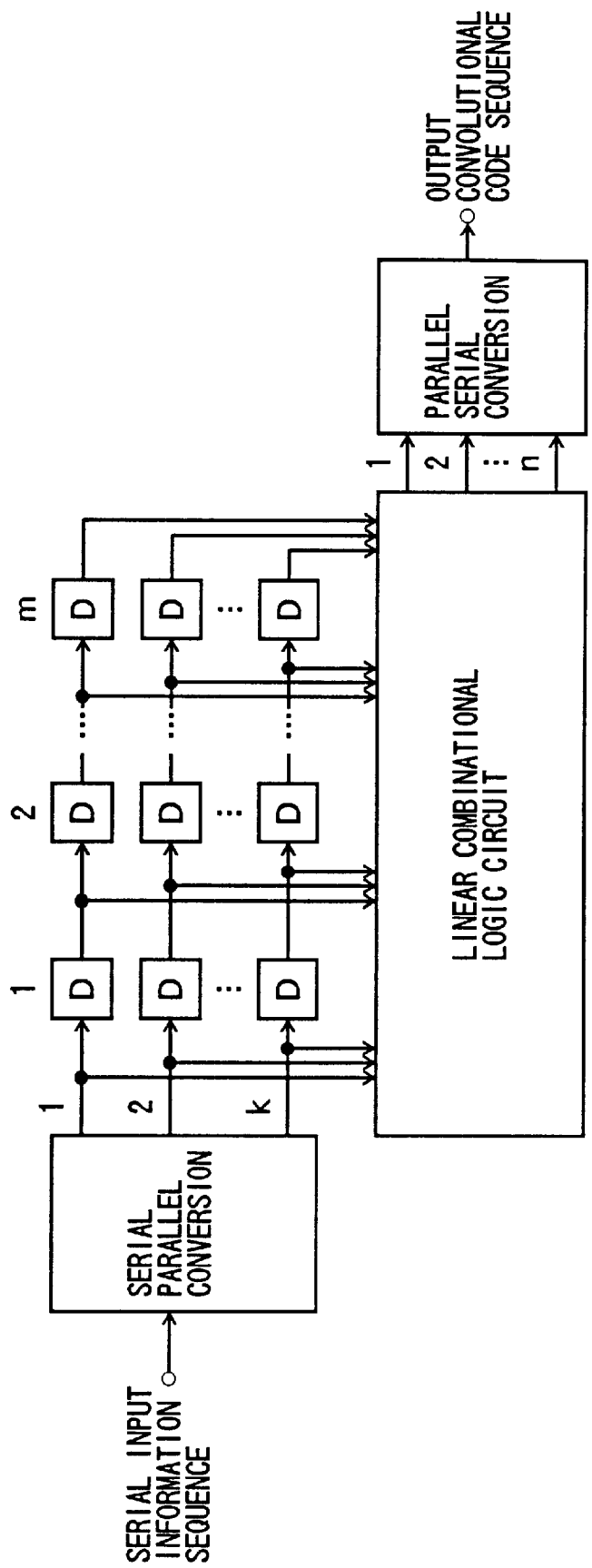
FIG. 4 is a block diagram of a general convolutional encoder.

FIG. 4 shows a block diagram of a general convolutional encoder. In the general convolutional encoder, a serial input information sequence is converted into k-bit parallel information blocks. Each k-bit parallel information block is converted into an n(>k)-bit parallel output block by a linear combinational logic circuit using past data blocks stored in delay elements D. Then an output convolutional code sequence which is serially converted from the n-bit parallel output blocks is output.

Figure 5:
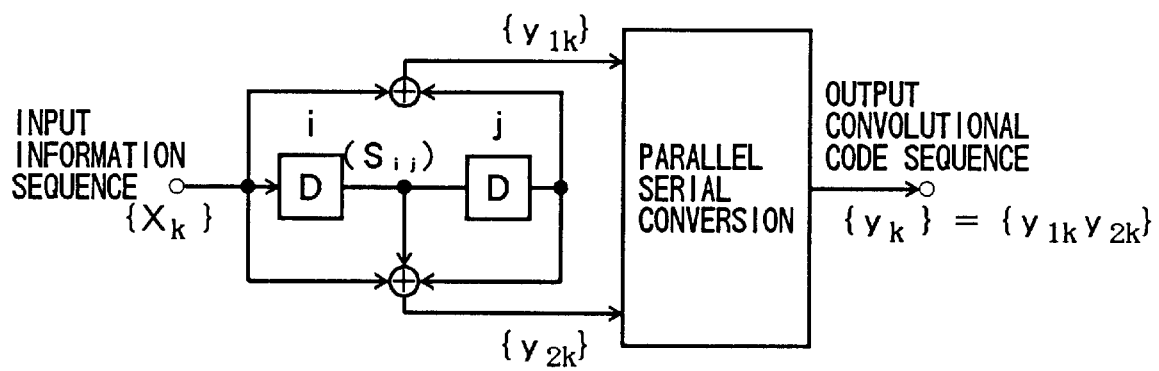
FIG. 5 is an example of a convolutional encoder when k equals one, m equals two and n equals two in the general convolutional encoder.

FIG. 5 shows an example of the convolutional encoder when k equals one, m equals two and n equals two in the general convolutional encoder. The output sequence $\{y_k\}=\{y_{1k}\ y_{2k}\}$ is expressed using the input sequence $\{x_k\}$ as follows.

$$y_{1k}=x_k+x_{k-2},\ y_{2k}=x_k+x_{k-1}+x_{k-2}$$

When X, $Y_1$, $Y_2$ are respectively converted from $\{x_k\}$, $\{y_{1k}\}$, $\{y_{1k}\}$ by a Z transform, then, $$Y_1=G_1(z)X,\ Y_2=G_2(z)X$$

$$G_1(z)=1+Z^{-2},\ G_2(z)=1+Z^{-1}+Z^{-2}$$

$G_1(z)$ and $G_2(z)$ are called generator polynomials of the convolutional code. Other generator polynomials are defined for other convolutional encoders in the same manner as shown above.

FIG. 6(a) shows a state transition diagram of the convolutional encoder. FIG. 6(b) shows a trellis diagram of the state transition diagram of the convolutional encoder.

In the convolutional encoder shown in FIG. 5, if the input sequence is {1001 . . . }, the output sequence of convolutional code is {11 01 11 11 . . . }.

Next, the explanation of FIG. 2 will be continued. In a repetition of transmission symbols step S4 of FIG. 2, the base station generates the transmission symbols, which are convolutionally encoded, according to the designated bit rate among 9.6 kbps, 4.8 kbps, 2.4 kbps and 1.2 kbps. When the designated bit rate is 9.6 kbps, then the transmission symbols are generated one time. When the designated bit rate is 4.8 kbps, then the transmission symbols are repeatedly generated twice. When the designated bit rate is 2.4 kbps, then the transmission symbols are repeatedly generated three times. When the designated bit rate is 1.2 kbps, then the transmission symbols are repeatedly generated four times. This is because the same number of bits is needed to detect the transmission bit rate at the mobile communication terminal. The transmission bit rate is selected at the base station, for example, in a high-density order of speech data from 9.6 kbps to 1.2 kbps. Because the selected transmission bit rate is not communicated to the mobile communication terminal, the mobile communication terminal must detect the transmission bit rate to reproduce a speech signal.

Next, in an interleaving step S5 of FIG. 2, these transmission symbols are interleaved. The interleaving rearranges an order of the symbols and is effective to raise an error correction performance for burst errors.

Next, in a long Code generation step S6, a decimator step S7 and a scrambling step S8 of FIG. 2, output symbols of the interleaving step are scrambled using long Code which is a user identification code and enables synchronization at the mobile communication terminal. Then, in the decimator step S9 and a power control bit insertion step S10 of FIG. 2, power control bits are added to the scrambled data and transmission data to be sent the mobile communication terminal is generated. The power control bits control strength of a radio wave to be transmitted to each mobile communication terminal. A weak radio wave is transmitted to a mobile communication terminal near the base station and a strong radio wave is transmitted to a mobile communication terminal far from the base station to equalize the strengths of the radio waves received by the mobile communication terminals.

After all of the processes described above from S1 to S10 are finished, in a spread spectrum modulation step S11 of FIG. 2, the base station spreads spectrum of the transmission data over a wide band. Then, the base station modulates the transmission data and transmits the transmission data. As spread spectrum communication has a characteristic that energy of each band unit is low, the spread spectrum communication is robust against both interference and disturbance from other systems. The base station transmits the transmission data to each mobile communication terminal as mentioned above.

Figure 7:
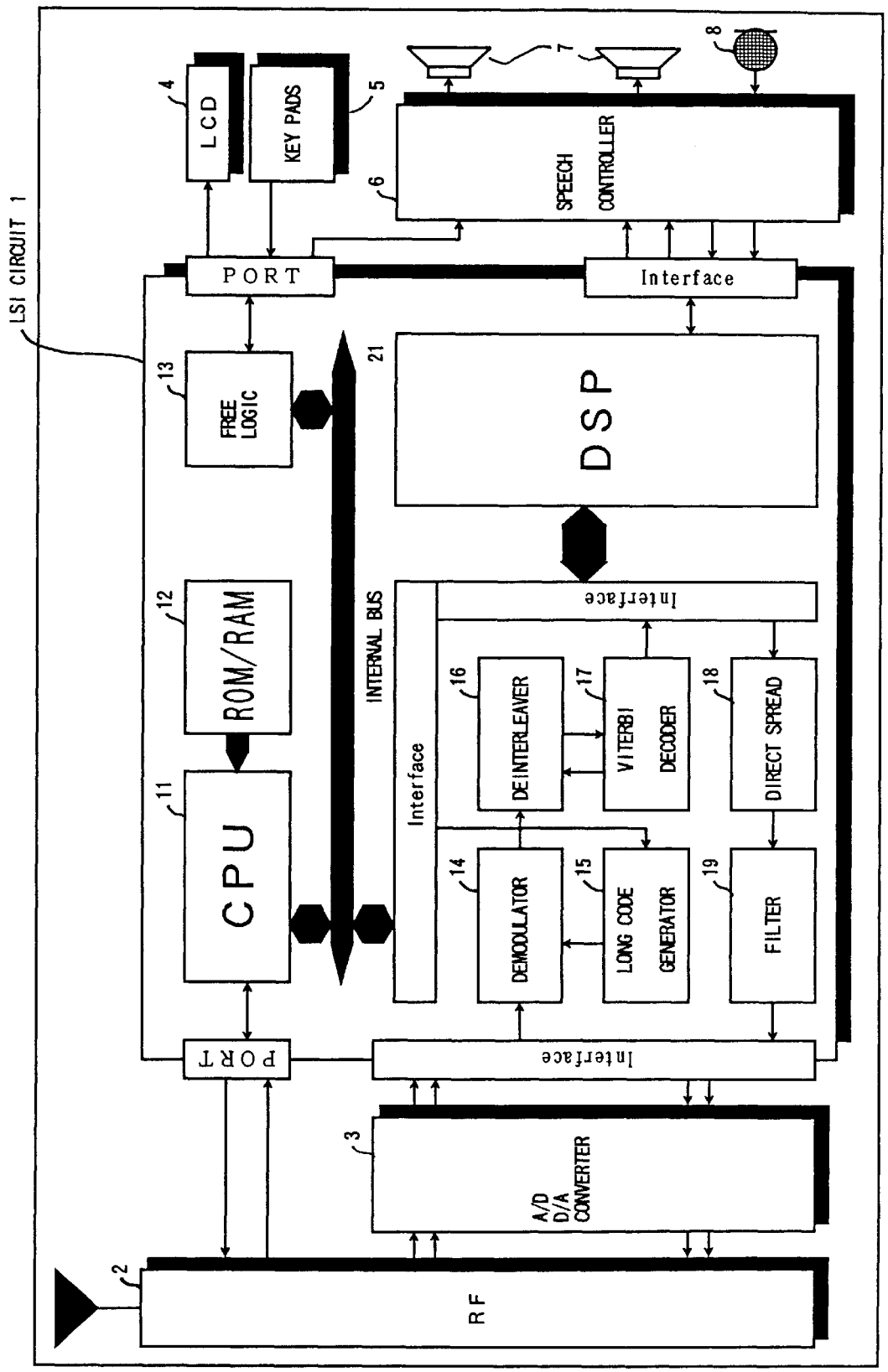
FIG. 7 is a block diagram of the mobile communication terminal of the present inventions.

Next, the mobile communication terminal of the present invention will be explained. FIG. 7 shows a block diagram of the mobile communication terminal of the present invention.

The mobile communication terminal shown in FIG. 7 is mainly made up of an RF unit 2, an A/D·D/A converter 3, an LSI circuit 1 and a speech controller 6. The RF unit 2 receives the radio wave from the base station. The A/D·D/A converter 3 converts an analog signal from the RF unit 2 into a digital signal, i.e., received data. The LSI circuit 1, which is equipped with a CPU 11, executes various kinds of data processing which will be described later. The speech controller 6 executes speech processing by a codec. In the mobile communication terminal, the LSI circuit 1 executes signal processing for key data from key pads 5 or speech data from a microphone 8 which is processed by the speech controller 6. The LSI circuit 1 also transmits data to the base station and displays characters on an LCD. The LSI circuit 1 and the speech controller 6 also execute signal processing for speech data or control data from the base station, display characters on the LCD and reproduce sound through speakers 7.

Next, structure and a function of the LSI circuit 1 will be explained. The LSI circuit 1 is made up of the CPU 11, a ROM/RAM 12, a free logic circuit 13, a long Code generator 15, a Viterbi decoder 17, a DSP 21, a demodulator 14, and a deinterleaver 16. The CPU 11, the ROM/RAM 12, the free logic circuit 13, the long Code generator 15 and the Viterbi decoder 17 are connected through an internal us. The DSP 21 is connected to the CPU 11 through an interface. The demodulator 14 demodulates the received data supplied from the A/D D/A converter 3 and the deinterleaver 16 generates the received symbols. The Viterbi decoder 17 executes the Viterbi decoding for the received symbols. The CPU 11 and the DSP 21 detect the transmission bit rate that is selected at the base station and the Viterbi decoder executes the Viterbi decoding according to the detected transmission bit rate.

The CPU 11 or the DSP 21 controls an operation for the transmission-bit-rate detection. The CPU 11 or the DSP 21 estimates the transmission bit rate which is selected at the base station and detects a correct transmission bit rate by decoded results according to an estimated transmission bit rate.

The ROM/RAM 12 stores a program to detect the transmission bit rate and data to be read or written during execution of the program. Because the DSP 21 can also execute such a program, the ROM/RAM 12 may be allocated in the DSP 21.

The free logic circuit 13 displays the characters from the key pads 5 on the LCD 4 and executes other functions.

The long Code generator 15 generates the long Code to synchronize with the received data according to information transmitted through a sync channel.

The demodulator 14 has a RATE receiver which receives the received data from the A/D·A/D converter 3 and demodulates the received data. The demodulator 14 also executes an inverse spread spectrum operation. Then, the demodulator 14 descrambles the received data according to the long Code from the long Code generator 15.

The deinterleaver 16 converts the order of the temporally interleaved data into a proper order and generates the received symbols.

The Viterbi decoder 17 executes the Viterbi decoding of the received symbols from the deinterleaver 16 according to the transmission bit rate estimated in the CPU 11. This Viterbi decoder 17 can execute the Viterbi decoding at any rate among 9.6 kbps, 4.8 kbps, 2.4 kbps and 1.2 kbps.

Figure 8:
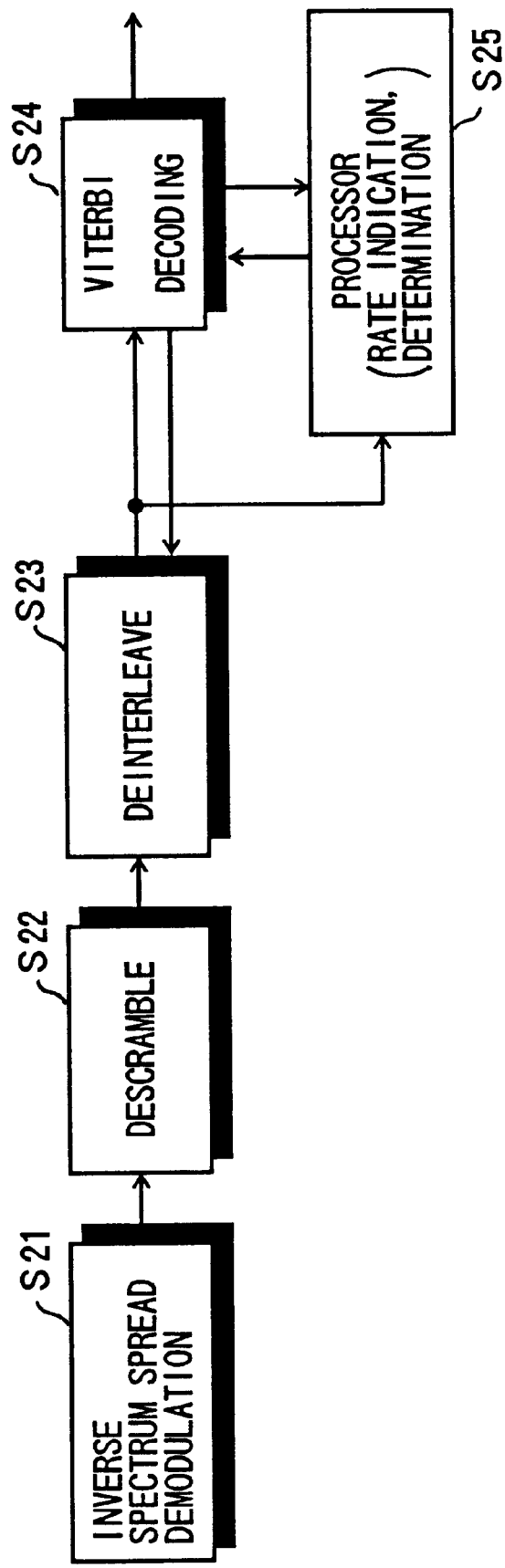
FIG. 8 is an outline of an operation of a CPU 11.
Figure 9:
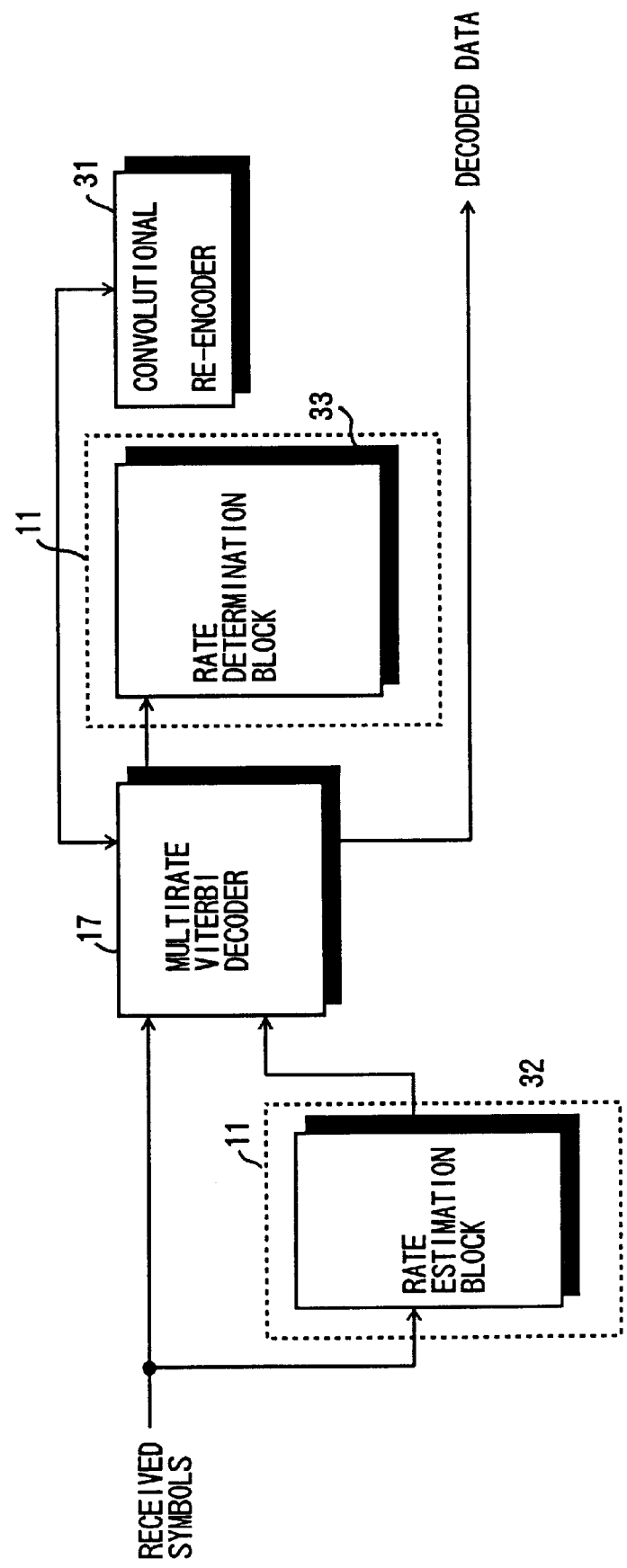
FIG. 9 shows main components of the CPU 11 or a DSP 21 in an LSI circuit 1 which executes the transmission-bit-rate detection.

When the LSI circuit 1 in the mobile communication terminal shown in FIG. 7 receives data, which is processed as shown in FIG. 2, transmitted from the base station, the LSI circuit 1 executes an operation as shown in FIG. 8. FIG. 8 shows an outline of an operation of the CPU 11. FIG. 9 shows main components of the CPU 11 or the DSP 12 in the LSI circuit 1, which CPU 11 or DSP 21 executes the transmission-bit-rate detection. In this embodiment of the present invention, the CPU 11 executes the transmission-bit-rate detection.

In the LSI circuit 1, first, the demodulator 14 executes inverse spread spectrum demodulation at an inverse spread spectrum demodulation step S21 and the descrambling based on the long Code generated by the long Code generator 15 at a descramble step S22. The deinterleaver 16 generates the received symbols by deinterleaving the received data at the deinterleave step S23.

The received symbols are supplied to the Viterbi decoder 17 and a rate estimation block 32 in the CPU 11 shown in FIG. 9. The rate estimation block 32 estimates the transmission bit rate which is selected among 9.6 kbps, 4.8 kbps, 2.4 kbps and 9.6 kbps at the base station. The multirate Viterbi decoder 17 executes the Viterbi decoding at the estimated bit rate and supplies decoded results to a convolutional re-encoder 31. The convolutional re-encoder 31 re-encodes the decoded results and supplies re-encoded data to the multirate Viterbi decoder 17. The Viterbi decoder 17 compares the received symbols with the re-encoded data and supplies a comparison result to a rate determination block 33. The rate determination block 33 detects whether the estimated transmission bit rate is correct or not based on the comparison result. For example, when the rate determination block 33 detects that the estimated transmission bit rate is correct, the Viterbi decoder 17 supplies the decoded data using the estimated transmission bit rate to the speech controller 6. On the other hand, when the rate determination block 33 detects that the estimated transmission bit rate is not correct, the rate estimation block 32 changes the estimate of the transmission bit rate. Then, the Viterbi decoder 17 repeats the Viterbi decoding at both a Viterbi decoding step S24 and a rate indication and determination step S25 until the rate determination block 33 detects that the estimated transmission bit rate is correct.

In the mobile communication terminal of this embodiment of the present invention, the transmission-bit-rate detection is executed as described above.

At the steps S24 and S25, when the rate determination block 33 detects that the estimated transmission bit rate is not correct, the rate estimation block 32 doubles or halves the estimate of the transmission bit rate. Then, the Viterbi decoder 17 may repeat the Viterbi decoding at the Viterbi decoding step S24 and the rate indication and determination step S25 until the rate determination block 33 detects that the estimated transmission bit rate is correct. For example, first, the Viterbi decoder 17 executes the Viterbi decoding at the transmission bit rate of 4.8 kbps. When the rate determination block 33 detects that the estimated transmission bit rate is not correct, the rate estimation block 32 changes the next estimate of the transmission bit rate into either 9.6 kbps or 2.4 kbps.

Next, the transmission-bit-rate detection executed by the Viterbi decoder 17, the CPU 11 and the DSP 21 will be precisely explained.

Figure 10:
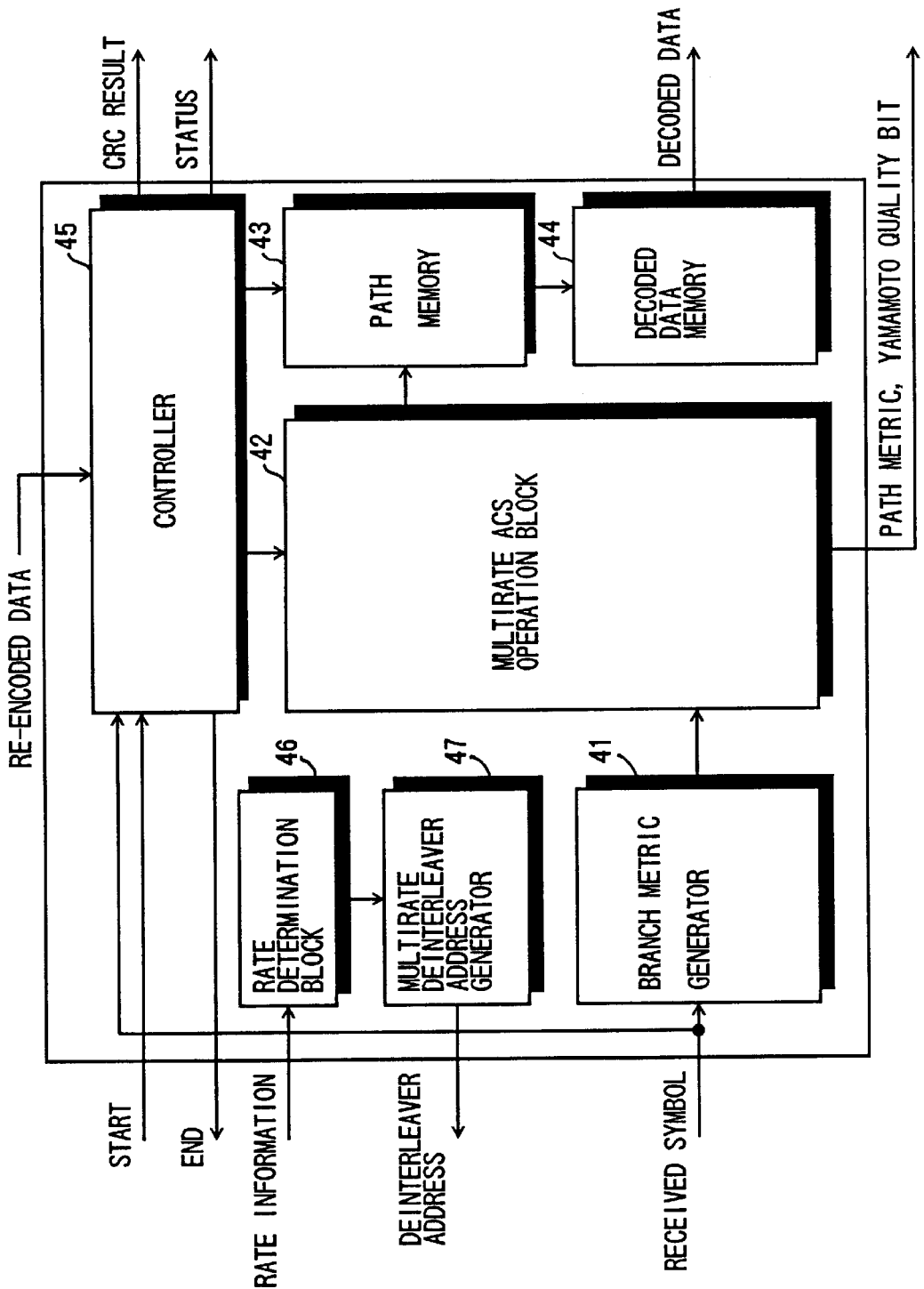
FIG. 10 is a detailed structure of a Viterbi decoder 17.

FIG. 10 shows a detailed structure of the Viterbi decoder 17. In this embodiment of the present invention, the CPU 11 executes the transmission-bit-rate detection.

The Viterbi decoder 17 is made up of a branch metric generator 41, a multirate ACS operation block 42, a path memory 43, a decoded data memory 44, a controller 45, a rate determination block 46 and a multirate deinterleaver address generator 47. The Viterbi decoder 17 executes the Viterbi decoding for the received symbols at a predetermined transmission bit rate.

Figure 11:
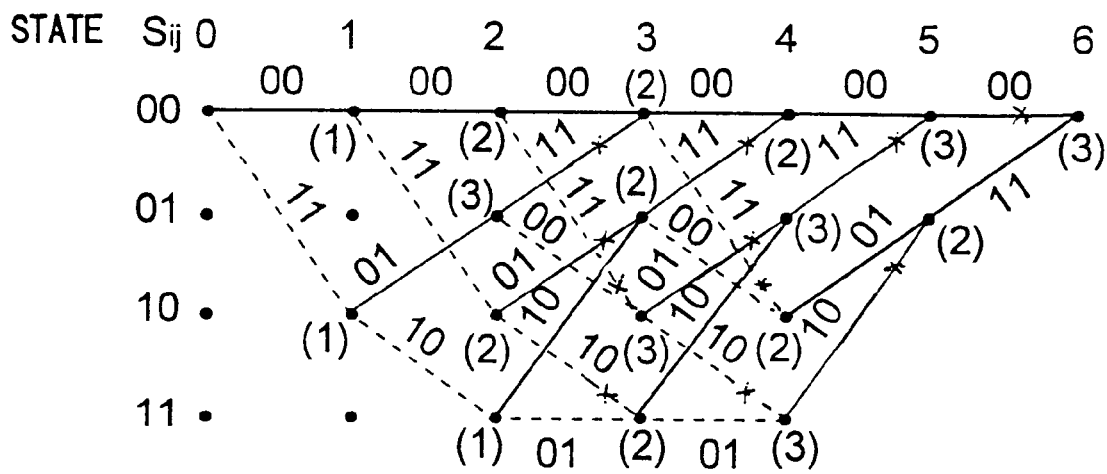
FIG. 11 is a Viterbi decoding algorithm for received symbols.

FIG. 11 shows a Viterbi decoding algorithm for the received symbols which are encoded by the encoder shown in FIG. 5. An input information sequence $\{x_k\}$ is convolutionally encoded into a convolutional code sequence $\{y_{1k}y_{2k}\}$. When an error sequence $\{e_{1k}e_{2k}\}$ occurs during transmission, a receiver receives a received sequence $\{z_{1k}z_{2k}\} = \{y_{1k}+e_{1k}, y_{2k}+e_{2k}\}$. The Viterbi decoder 17 detects a maximum likelihood input sequence using the Viterbi decoding algorithm shown in FIG. 11.

Next, a function of each circuit element which forms the Viterbi decoder 17 will be explained. The branch metric generator 41 calculates branch metrics which are needed to execute the Viterbi decoding for the received symbols. The branch metric λ is;

$$\lambda_{ikjk} = \{(Z_{1k} \oplus k) + (Z_{2k} \oplus j_k)\}$$

The multirate ACS operation block 42 is mainly made up of an adder, a path metric memory, a comparator and a selector. The adder adds the calculated branch metric to the pre-calculated branch metric so that the path metric is calculated. The path memory stores the path metric. The comparator compares two path metrics when the two paths are merged at a state $S_{ij}$. Then, the selector selects a maximum likelihood path and outputs the maximum likelihood input sequence in reverse order. The selector also outputs a Yamamoto Quality bit which shows whether a difference between a path metric of a selected path and the path metric is greater than a predetermined value or is smaller than the predetermined value.

The path memory 43 stores the input sequence which is decoded by the multirate ACS operation block 42 in an output order.

The decoded data memory 44 rearranges the input sequence stored in the path memory 43 into the proper order and outputs the decoded data.

The controller 45 controls the Viterbi decoder 17 to start execution of decoding according to a start message from the CPU 11 or the DSP 21 and to send an end message after finishing decoding. The controller 45 also outputs a comparison result of the cyclic code which is the CRC result shown in FIG. 10 and a comparison result, which is the status shown in FIG. 10, between the re-encoded data by the convolutional re-encoder 31 and the received symbols before decoding by the Viterbi decoder 17.

The rate determination block 46 sets rate information which is a designated transmission bit rate by the CPU 11 or the DSP 21.

Figure 12:
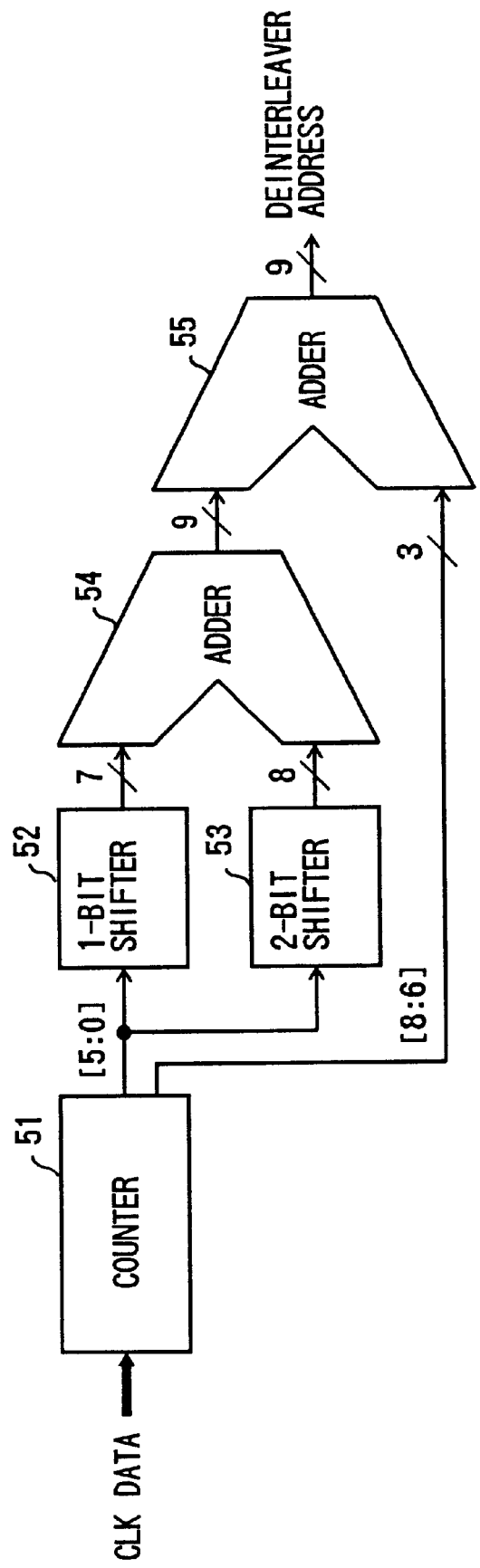
FIG. 12 is a structure of a multirate deinterleaver address generator 47.

FIG. 12 shows a structure of the multirate deinterleaver address generator 47. The multirate deinterleaver address generator 47 is made up of a 9-bit counter 51, a 1-bit shifter 52, a 2-bit shifter 53 and an adder 55. The 9-bit counter 51 operates synchronously with a clock signal designated by the CPU 11 and predetermined data is loaded therein. The multirate deinterleaver address generator 47 divides a 9-bit count value [8:0] supplied from the 9-bit counter 51 into 6-bit data and 3-bit data. The 1-bit shifter 52 shifts the divided 6-bit data [5:0] left and makes 7-bit data. The 2-bit shifter 53 shifts the divided 6-bit data [5:0] left and makes 8-bit data. The adder 54 adds both the 7-bit data and the 8-bit data and outputs 9-bit data which is 6 times the original 6-bit data [5:0]. The adder 55 adds the 9-bit data and the 3-bit data [8:6] which was a reminder of the previously divided 9-bit count value [8:0] and outputs an address to the deinterleaver 16. The multirate deinterleaver address generator 47 can generate the deinterleaver address at all four transmission bit rates.

Figure 13:
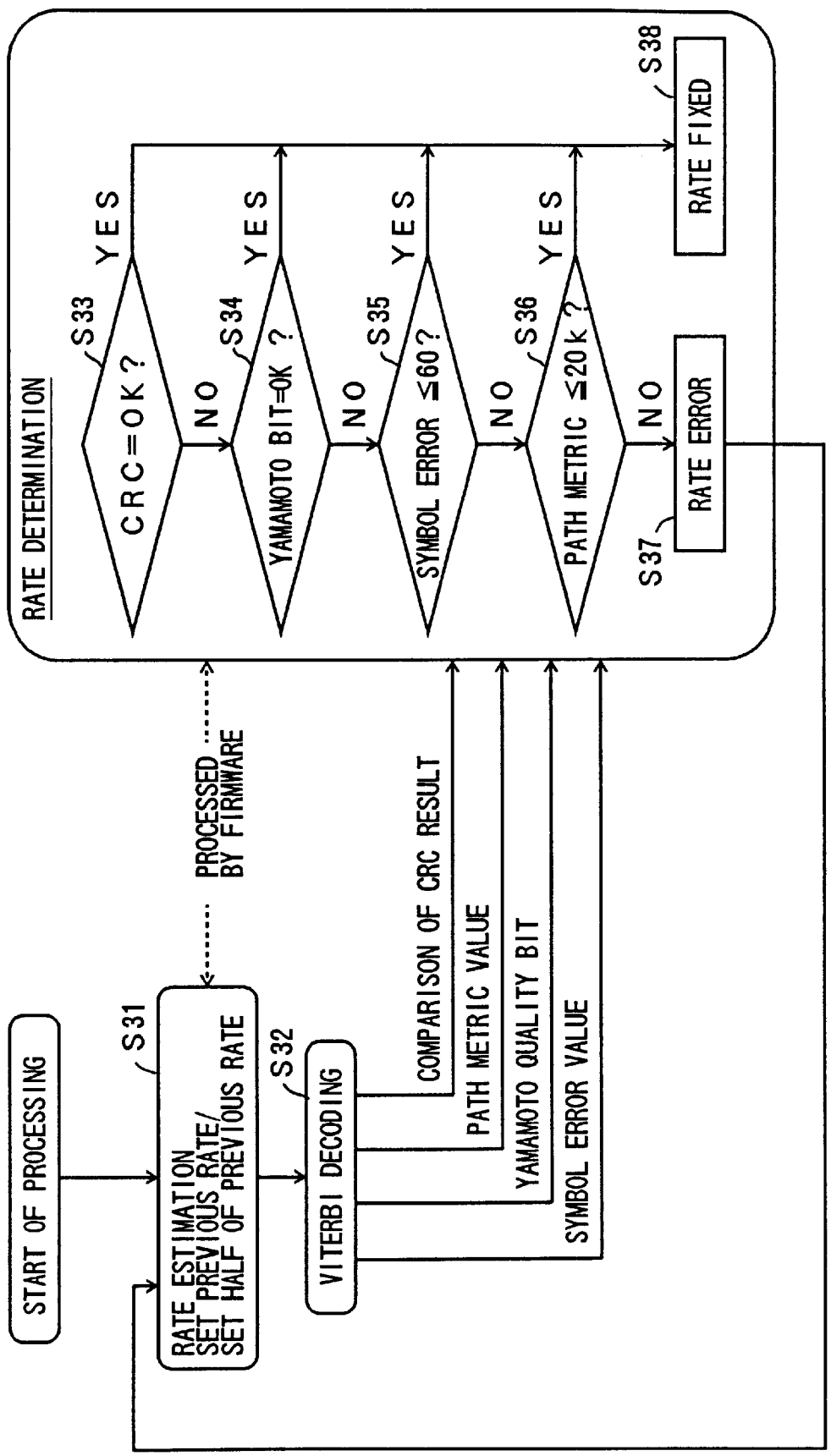
FIG. 13 is a transmission-bit-rate detection algorithm.

FIG. 13 shows a transmission-bit-rate detection algorithm which is executed by the Viterbi decoder 17 and the CPU 11 of the embodiment of the present invention.

The received symbols generated by the deinterleaver 16 are supplied to the Viterbi decoder 17 and the rate estimation block 32 in the CPU 11 shown in FIG. 9. The rate estimation block 32 estimates the transmission bit rate which is selected at the base station. Then, one of the transmission bit rates among 9.6 kbps, 4.8 kbps, 2.4 kbps and 1.2 kbps is set to the Viterbi decoder 17 in the step S31. First, the estimate of the transmission bit rate is the transmission bit rate which was used in the previous Viterbi decoding.

Next, the Viterbi decoder 17 executes the Viterbi decoding for the received symbols at the estimated transmission bit rate in the step S32. The Viterbi decoding algorithm will be explained with FIG. 11. An input information sequence $\{x_k\}$ is convolutionally encoded into a convolutional code sequence $\{y_{1k}y_{2k}\}$. When an error sequence $\{e_{1k}e_{2k}\}$ occurs during transmission, the Viterbi decoder 17 receives a received sequence $\{z_{1k}z_{2k}\}=\{y_{1k}+e_{1k}, y_{2k}+e_{2k}\}$. When a received sequence is $\{01, 10, 00, 00, 01, 10\}$, the Viterbi decoder 17 detects a proper path which is the correct input information sequence $\{x_k\}$. The Viterbi decoder 17 uses the received sequence and a path which starts from a state $S_{00}$ at a point of time k=0 and ends at the state $S_{00}$ through paths in a trellis diagram.

First, the branch metric generator 41 in the Viterbi decoder 17 calculates the branch metric which is a Hamming distance between the received sequence $\{z_{1k}z_{2k}\}$ and each branch $(i_k j_k)$ shown in FIG. 11. The multirate ACS operation block 42 calculates the path metrics at a point of time k when paths are merged at $S_{ij}$ at each point of time k (k=1, 2, 3, 4, 5). The comparator compares the path metrics and the selector selects a survival path which has a minimum path metric. Then other paths which are shown with marks X in FIG. 11 are deleted. Figures with a parenthesis shows the path metric. The paths are deleted as mentioned above. Therefore one survived path has a minimum path metric. This path is the maximum likelihood path. As a result, a sequence (1, 1, 0, 1, 0, 0) is detected as a correct input sequence. At the same time, a convolutional code sequence (11, 10, 10, 00, 01, 11) and an error sequence (10, 00, 10, 00, 00, 01) are output.

The controller 45 in the Viterbi decoder 17 supplies the decoded results to the re-encoder 31. The re-encoder 31 re-encodes the decoded results and supplies re-encoded data to the controller 45. The controller 45 compares the re-encoded data and the received symbols before decoding by the Viterbi decoder 17 and generates the status. This status and the CRC result using the cyclic code are supplied to the rate determination block 33 in the step S32.

At the same time, the multirate ACS operation block 42 outputs the path metric of the selected path and Yamamoto Quality bit which shows whether a difference between path metrics is greater than a predetermined value or is smaller than the predetermined value in the step S32.

The rate determination block 33 detects whether the estimated transmission bit rate is correct or not. For example, when the result of the CRC is correct in a step S33, the rate determination block 33 determines that the estimated transmission bit rate is correct in a step S38. When the result of the CRC is not correct in the step S33 and the Yamamoto quality bit is greater than the predetermined value in a step S34, the rate determination block 33 determines that the estimated transmission bit rate is correct in the step S38. When the result of the CRC is not correct in the step S33, the Yamamoto quality bit is smaller than the predetermined value in the step S34 and a symbol error shown by the status is smaller than 60 in a step S35, the rate determination block 33 determines that the estimated transmission bit rate is correct in the step S38. When the result of the CRC is not correct in the step S33, the Yamamoto quality bit is smaller than the predetermined value in the step S34, the symbol error shown by the status is greater than 60 in the step S35 and the path metric value is smaller than 20 k in a step S36, the rate determination block 33 determines that the estimated transmission bit rate is correct in the step S38. Then, the decoded data is supplied to the DSP 21 and the controller 6.

On the other hand, when the result of the CRC is not correct in the step S33, the Yamamoto quality bit is smaller than the predetermined value in the step S34, the symbol error shown by the status is greater than 60 in the step S35 and the path metric value is greater than 20 k in the step S36, the rate estimation block 32 determines that the estimated bit rate is not correct in a step S37. Then, the rate estimation block 32 halves or doubles the estimate of the transmission bit rate in the step S31. Then, the Viterbi decoder repeats the Viterbi decoding until the transmission bit rate is fixed in the step S38.

As the transmission bit rate which is selected at the base station is estimated by the CPU 11 and the DSP 21 in the mobile communication terminal of the embodiment of the present invention, a plurality of decoders for all bit rates is not necessary.

As the CPU 11 and the DSP 21 determine whether the estimated transmission bit rate is correct or not based on various kinds of information, a plurality of decoders and convolutional re-encoders for all bit rates is not necessary.

Therefore, the simultaneous decoding at all bit rates and the simultaneous re-encoding at all bit rates are not executed. This results in the small-sized mobile communication terminal based on the reduction of the circuit scale and enables the reduction of the consumption power of the mobile communication terminal.

The present invention is not limited to the specifically disclosed embodiments, and variations and modifications may be made without departing from the scope of the present invention.

The present application is based on Japanese priority application No. 10-147760 filed on May 28, 1998, the entire contents of which are hereby incorporated by reference.

What is claimed is:

1. A mobile communication terminal which receives an encoded data transmitted from a base station and detects a transmission bit rate selected at the base station, the communication terminal comprising:

a demodulator that receive and demodulates the encoded data;

a rate estimation unit that estimates a transmission bit rate and outputs an estimated transmission bit rate of the receive encoded data;

a decoding unit that repeatedly decodes the received encoded data at the estimated transmission bit rate until the rate estimation unit detects a correct estimated transmission bit rate, and thereby outputs a decoded data at the correct estimated transmission bit rate; and a re-encoding unit that re-encodes the decoded data and outputs re-encoded data.

2. The mobile communication terminal as claimed in claim 1, wherein said decoding unit comprises:

an operation unit that calculates branch metrics for executing a Viterbi decoding of the received encoded data; and a Viterbi decoder that executes the Viterbi decoding at the estimated transmission bit rate based on the branch metrics.

3. The mobile communication terminal as claimed in claim 2, wherein said rate estimation unit comprises a first part which determines the estimated transmission bit rate as a proper transmission bit rate when the estimated transmission bit rate is detected to be correct and changes the estimated transmission bit rate when the estimated transmission bit rate is detected not to be correct, and a second part which makes said decoding unit repeatedly to execute said Viterbi decoding until the estimated transmission bit rate is detected to be correct.

4. The mobile communication terminal as claimed in claim 3, wherein said rate estimation unit multiplies or divides the estimated transmission bit rate by two when the estimated transmission bit rate is detected not to be correct and makes said decoding unit repeatedly to execute said Viterbi decoding until a changed estimated transmission bit rate is detected to be correct.

5. The mobile communication terminal as claimed in claim 2, wherein said decoding unit starts said Viterbi decoding according to a start message and outputs an end message after said Viterbi decoding is finished.

6. The mobile communication terminal as claimed in claim 2, wherein the estimated transmission bit rate that is output by said rate estimation unit is the transmission bit rate that was used for said Viterbi decoding before presently executing said Viterbi decoding.

7. The mobile communication terminal as claimed in claim 1, wherein the decoding unit outputs predetermined types of results of decoding, which include a CRC value, a Yamamoto Quality bit and a path metric.

8. The mobile communication terminal of claim 1, wherein the decoding unit outputs the decoded data on the basis of a comparison result between the received encoded data and the re-encoded data.

9. The mobile communication terminal of claim 1, further comprising:

a rate detection unit that detects whether the estimated transmission bit rate is correct on the basis of the decoded data.

10. The mobile communication terminal of claim 1, wherein the received encoded data is a convolutionally encoded data.

11. A transmission-bit-rate detection method for detecting a transmission bit rate from a received encoded data, the method comprising:

estimating the transmission bit rate and outputting an estimated transmission-bit-rate of the received encoded data;

repeatedly decoding the received encoded data at the estimated transmission bit rate until detecting that the estimated transmission bit rate is correct;

outputting a decoded data at the correct estimated transmission bit rate; and re-encoding the decoded data and outputting re-encoded data.

12. The transmission-bit-rate detection method as claimed in claim 11, wherein said decoding comprises:

calculating branch metrics for executing a Viterbi decoding of said received encoded data; and executing said Viterbi decoding at the estimated transmission bit rate based on said branch metrics.

13. The transmission-bit-rate detection method as claimed in claim 12, wherein said estimating comprises:

determining the estimated transmission bit rate as a proper transmission bit rate when the estimated transmission bit rate is detected to be correct;

changing the estimated transmission bit rate when the estimated transmission bit rate is detected not to be correct; and performing said decoding repeatedly to execute said Viterbi decoding until the estimated transmission bit rate is detected to be correct.

14. The transmission-bit-rate detection method as claimed in claim 13, wherein the changing multiplies or divides the estimated transmission bit rate by two when the estimated transmission it rate is detected not to be correct and performs said decoding repeatedly to execute said Viterbi decoding until a changed estimated transmission bit rate is detected to be correct.

15. The transmission-bit-rate detection method as claimed in claim 12, wherein said decoding further comprises:

starting said Viterbi decoding according to a start message; and outputting an end message after said Viterbi decoding is finished.

16. The transmission-bit-rate detection method as claimed in claim 12, wherein the estimated transmission bit rate that is output by said rate estimation step is the transmission bit rate that was used for said Viterbi decoding before presently executing said Viterbi decoding.

17. The transmission-bit-rate detection method as claimed in claim 11, further comprising outputting predetermined types of results of decoding, which include a CRC value, a Yamamoto Quality bit and a path metric.

18. The transmission-bit-rate detection method of claim 11, wherein the decoding outputs the decoded data on the basis of a comparison result between the received encoded data and the re-encoded data.

19. The transmission-bit-rate detection method of claim 11, further comprising:

detecting whether the estimated transmission bit rate is correct on the basis of the decoded data.

20. The transmission-bit-rate detection method of claim 11, wherein the received encoded data is a convolutionally encoded data.

21. A communication terminal that receives an encoded data transmitted from a base station an detects a transmission bit rate selected at the base station, comprising:

a demodulator that receive and demodulates the encoded data;

a rate estimation unit that estimates a transmission bit rate and outputs an estimated transmission bit rate of the receive encoded data;

a decoding unit that decodes the received encoded data at the estimated transmission bit rate and outputs a first decode data; and a re-encoding unit that re-encodes the first decoded data and outputs re-encoded data, wherein the decoding unit repeatedly decodes the received encoded data until the rate estimation unit detects a correct estimated transmission bit rate, and thereby the decoding unit outputs a second decoded data at the correct estimated transmission bit rate.

22. The communication terminal of claim 21, wherein the decoding unit outputs the second decoded data on the basis of a comparison result between the received encoded data and the re-encoded data.

23. The communication terminal of claim 21, further comprising:

a rate detection unit that detects whether the estimated transmission bit rate is correct on the basis of the first decoded data.

24. The communication terminal of claim 21, wherein the received encoded data is a convolutionally encoded data.

25. The communication terminal of claim 21, wherein the second decoded data is the first decoded data or a new decoded data at a new estimated transmission bit rate.

26. An LSI circuit for receiving encoded data transmitted from a base station and detecting a transmission bit rate selected at the base station, the LSI circuit comprising:

a rate estimation unit that estimates a transmission bit rate and outputs an estimated transmission bit rate of the receive encoded data;

a decoding unit that repeatedly decodes the received encoded data at the estimated transmission bit rate until the rate estimation unit detects a correct estimated transmission bit rate, and thereby outputs a decoded data at the correct estimated transmission bit rate; and a re-encoding unit that re-encodes the decoded data and outputs re-encoded data.

27. The LSI circuit of claim 26, wherein the decoding unit outputs the decoded data on the basis of comparison result between the received encoded data and the re-encoded data.

28. The LSI circuit of claim 26, further comprising:

a rate detection unit that detects whether the estimated transmission bit rate is correct on the basis of the decoded data.

29. The LSI circuit of claim 26, wherein the received encoded data is a convolutionally encoded data.

30. The LSI circuit of claim 26, wherein the decoding unit comprises:

an operation unit that calculates branch metrics for executing a Viterbi decoding of the received encoded data; and a Viterbi decoder that executes the Viterbi decoding at the estimated transmission bit rate based on the branch metrics.

31. The LSI circuit of claim 26, wherein the rate estimation unit comprises:

a first part that determines the estimated transmission bit rate as a proper transmission bit rate when the estimated transmission bit rate is detected to be correct and changes the estimated transmission bit rate when the estimated transmission bit rate is detected not to be correct; and a second part that makes the decoding unit repeatedly execute a Viterbi decoding until the estimated transmission bit rate is detected to be correct.

32. The LSI circuit of claim 26, wherein the rate estimation unit multiplies or divides the estimated transmission bit rate by two when the estimated transmission rate is detected not to be correct and makes the decoding unit repeatedly execute a Viterbi decoding until a changed estimated transmission bit rate is detected to be correct.

33. The LSI circuit of claim 26, wherein the decoding unit starts a Viterbi decoding according to a start message and outputs an end message after the Viterbi decoding is finished.

34. The LSI circuit of claim 26, wherein the decoding unit outputs predetermined types of results of decoding include a CRC value, a Yamamoto Quality bit, and a path metric.

35. The LSI circuit of claim 26, wherein the estimated transmission bit rate that is output by the rate estimation unit is the transmission bit rate that was used for a Viterbi decoding before presently executing the Viterbi decoding.

36. An LSI circuit for receiving encoded data transmitted from a base station and detecting a transmission bit rate selected at the base station, the LSI circuit comprising:

a rate estimation unit that estimates a transmission bit rate and outputs an estimated transmission bit rate of the receive encoded data;

a decoding unit that decodes the received encoded data at the estimated transmission bit rate and outputs a first decoded data; and a re-encoding unit that re-encodes the first decoded data and outputs re-encoded data, wherein the decoding unit repeatedly decodes the received encoded data until the rate estimation unit detects a correct estimated transmission bit rate, and thereby the decoding unit outputs a second decoded data at the correct estimated transmission bit rate.

37. The LSI circuit of claim 36, wherein the decoding unit outputs the second decoded data on the basis of a comparison result between the received encoded data and the re-encoded data.

38. The LSI circuit of claim 36, further comprising:

a rate detection unit that detects whether the estimated transmission bit rate is correct on the basis of the first decoded data.

39. The LSI circuit of claim 36, wherein the received encoded data is a convolutionally encoded data.

40. The LSI circuit of claim 36, wherein the second decoded data is the first decoded data or a new decoded data at a new estimated transmission bit rate.

41. The LSI circuit of claim 36, wherein the decoding unit comprises:

an operation unit that calculates branch metrics for executing a Viterbi decoding of the received encoded data; and a Viterbi decoder that executes the Viterbi decoding at the estimated transmission bit rate based on the branch metrics.

42. The LSI circuit of claim 41, wherein the rate estimation unit comprises:

a first part that determines the estimated transmission bit rate as a proper transmission bit rate when the estimated transmission bit rate is detected to be correct and changes the estimated transmission bit rate when the estimated transmission bit rate is detected not to be correct; and a second part that makes the decoding unit repeatedly execute the Viterbi decoding until the estimated transmission bit rate is detected to be correct.

43. The LSI circuit of claim 41, wherein the rate estimation unit multiplies or divides the estimated transmission bit rate by two when the estimated transmission rate is detected not to be correct and makes the decoding unit repeatedly execute the Viterbi decoding until a changed estimate transmission bit rate is detected to be correct.

44. The LSI circuit of claim 41, wherein the decoding unit starts the Viterbi decoding according to start message and outputs an end message after the Viterbi decoding is finished.

45. The LSI circuit of claim 41, wherein the estimated transmission bit rate that is output by the rate estimation unit is the transmission bit rate that was used for the Viterbi decoding before presently executing the Viterbi decoding.

46. The LSI circuit of claim 36, wherein the decoding unit outputs predetermined types of results of decoding, which include a CRC value, a Yamamoto Quality bit, and a path metric.

47. A transmission-bit-rate detection method for detecting a transmission bit rate from a received encoded data, the method comprising:

estimating the transmission bit rate and outputting an estimated transmission bit rate of the received encoded data;

decoding the received encoded data at the estimated transmission bit rate and outputting a first decoded data; and re-encoding the first decoded data and outputting re-encoded data, wherein the received encoded data is repeatedly decoded until the estimated transmission bit rate is detected a correct and wherein the second decoded data is outputted at the correct estimated transmission bit rate.

48. The transmission-bit-rate detection method of claim 47, wherein the decoding outputs the second decoded data on the basis of a comparison result between the received encoded data and the re-encoded data.

49. The transmission-bit-rate detection method of claim 47, further comprising:

detecting whether the estimated transmission bit rate is correct on the basis of the first decoded data.

50. The transmission-bit-rate detection method of claim 47, wherein the received encoded data is a convolutionally encoded data.

51. The transmission-bit-rate detection method of claim 47, wherein the second decoded data is the first decoded data or a new decoded data at a new estimated transmission bit rate.

52. The transmission-bit-rate detection method of claim 47, wherein the decoding comprises calculating branch metrics for executing a Viterbi decoding of the received encoded data; and executing the Viterbi decoding at the estimated transmission bit rate based on the branch metrics.

53. The transmission-bit-rate detection method of claim 52, wherein the estimating comprises:

determining the estimated transmission bit rate as a proper transmission bit rate when the estimated transmission bit rate is detected to be correct; and multiplying or dividing the estimated transmission bit rate by two when the estimated transmission bit rate is detected not to be correct and repeatedly executing the Viterbi decoding until the estimated transmission bit rate is detected to be correct.

54. The transmission-bit-rate detection method of claim 52, wherein the estimating multiplies or divides the estimated transmission bit rate by two when the estimated transmission bit rate is detected not to be correct and repeatedly executes the Viterbi decoding until the estimated transmission bit rate is detected to be correct.

55. The transmission-bit-rate detection method of claim 52, wherein the decoding starts the Viterbi decoding according to a start message and outputs an end message after the Viterbi deciding is finished.

56. The transmission-bit-rate detection method of claim 52, wherein the estimated transmission bit rate is the transmission bit rate that was used for the Viterbi decoding before presently executing the Viterbi decoding.

57. The transmission-bit-rate detection method of claim 47, further comprising outputting predetermined types of results of decoding, which include a CRC value, a Yamamoto Quality bit, and a path metric.

58. A mobile communication terminal which receives an encoded data transmitted from a base station an detects a transmission bit rate selected at the base station, the communication terminal comprising:

a rate estimation unit that estimates a transmission bit rate and outputs an estimated transmission bit rate;

a decoding unit that decodes the received encoded data at the estimated transmission bit rate and outputs a decoded data; and a re-encoding unit that re-encodes the decoded data and outputs re-encoded data;

wherein the decoding unit outputs the decoded data on the basis of the re-encoded data, wherein said decoding unit comprises:

an operation unit that calculates branch metrics for executing a Viterbi decoding of the received encoded data; and a Viterbi decoder that executes the Viterbi decoding at the estimated transmission bit rate based on the branch metrics, wherein said rate estimation unit comprises a first part which determines the estimated transmission bit rate as a proper transmission bit rate when the estimated transmission bit rate is detected to be correct and change the estimated transmission bit rate when the estimated transmission bit rate is detected not to be correct, and a second part which makes said decoding unit repeatedly to execute said Viterbi decoding until the estimated transmission bit rate is detected to be correct, wherein said rate estimation unit multiplies or divides the estimated transmission bit rate by two when the estimated transmission bit rate is detected not to be correct and makes said decoding unit repeatedly to execute said Viterbi decoding until a changed estimated transmission bit rate is detected to be correct.

59. A transmission-bit-rate detection method for detecting a transmission bit rate from a received encoded data, the method comprising:

estimating a transmission it rate and outputting an estimated transmission-bit-rate;

decoding the received encoded data at the estimated transmission bit rate;

outputting a decoded data; and re-encoding the decoded data and outputting re-encoded data, wherein the decoding outputs the decoded data on the bases of the re-encoded data, wherein the decoding comprises:

calculating branch metrics for executing a Viterbi decoding of said received encoded data; and executing said Viterbi decoding at the estimated transmission bit rate based on said branch metrics, wherein said estimating comprises:

determining the estimated transmission bit rate as a proper transmission bit rate when the estimated transmission it rate is detected to be correct;

changing the estimated transmission bit rate when the estimated transmission bit rate is detected not to be correct; and performing said decoding repeatedly to execute said Viterbi decoding until the estimated transmission bit rate is detected to be correct, wherein the changing multi lies or divides the estimated transmission bit rate by two when the estimated transmission it rate is detected not to be correct and performs said decoding repeatedly to execute said Viterbi decoding until a changed estimated transmission bit rate is detected to be correct.

60. A transmission-bit-rate detection method for detecting a transmission bit rate from a received encoded data, comprising:

estimating the transmission bit rate and outputting an estimated transmission bit rate;

decoding the received encoded data at the estimated transmission bit rate and outputting a first decoded data; and re-encoding the first decoded data and outputting re-encoded data, wherein the decoding outputs a second decoded data on the basis of the re-encoded data, wherein the estimating comprises:

determining the estimated transmission bit rate as a proper transmission bit rate when the estimated transmission it rate is detected to be correct; and multiplying or dividing the estimated transmission bit rate by two when the estimated transmission bit rate is detected not to be correct and repeatedly executing a Viterbi decoding until the estimated transmission bit rate is detected to be correct.

61. A transmission-bit-rate detection method for detecting a transmission bit rate from a received encoded data, comprising:

estimating the transmission bit rate and outputting an estimated transmission bit rate;

decoding the received encoded data at the estimated transmission bit rate and outputting a first decoded data; and re-encoding the first decoded data and outputting re-encoded data, wherein the decoding outputs a second decoded data on the basis of the re-encoded data, wherein the estimating multiplies or divides the estimated transmission bit rate by two when the estimated transmission it rate is detected not to be correct and repeatedly executes a Viterbi decoding until the estimated transmission bit rate is detected to be correct.

* * * * *

UNITED STATES PATENT AND TRADEMARK OFFICE
CERTIFICATE OF CORRECTION

PATENT NO. : 6,639,954 B2
DATED : October 28, 2003
INVENTOR(S) : Koichi Kuroiwa et al.

It is certified that error appears in the above-identified patent and that said Letters Patent is hereby corrected as shown below:

Column 16,
Line 63, change "it" to -- bit --.

Column 17,
Line 13, change "it" to -- bit --.
Line 21, change "multi plies" to -- multiplies --.

Column 18,
Lines 8 and 18, change "it" to -- bit --.

Signed and Sealed this

Twenty-third Day of December, 2003

JAMES E. ROGAN
*Director of the United States Patent and Trademark Office*